US008342270B2

(12) United States Patent
Takenaka et al.

(10) Patent No.: US 8,342,270 B2
(45) Date of Patent: Jan. 1, 2013

(54) OMNI-DIRECTIONAL DRIVE DEVICE AND OMNI-DIRECTIONAL VEHICLE USING THE SAME (75) Inventors: Toru Takenaka, Wako (JP); Makoto Hirano, Wako (JP); Hideharu Izumi, Wako (JP); Kazuya Kuwabara, Wako (JP); Taiji Koyama, Wako (JP); Shinichiro Kobashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 490 days.

(21) Appl. No.: 12/450,357

(22) PCT Filed: Apr. 8, 2008

(86) PCT No.: PCT/JP2008/000908
§ 371 (c)(1),
(2), (4) Date: Sep. 22, 2009

(87) PCT Pub. No.: WO2008/132779
PCT Pub. Date: Nov. 6, 2008

(65) Prior Publication Data
US 2010/0096905 A1     Apr. 22, 2010

(30) Foreign Application Priority Data
Apr. 20, 2007   (JP) .................................. 2007-112288

(51) Int. Cl.
*B62D 57/00*   (2006.01)
(52) U.S. Cl. ............. 180/7.1; 180/20; 180/21; 301/5.23
(58) Field of Classification Search .................... 180/7.1, 180/10, 20, 21; 301/5.1, 5.23; 305/6, 7
See application file for complete search history.

(56) References Cited

U.S. PATENT DOCUMENTS

| 244,296 | A | * | 7/1881 | Prosser | 305/7 |
| 858,489 | A | * | 7/1907 | Vaughan | 305/7 |
| 1,145,088 | A | * | 7/1915 | Slaght | 305/7 |
| 1,257,318 | A | * | 2/1918 | Coats | 29/894.34 |
| 1,416,253 | A | * | 5/1922 | Bobek | 152/284 |
| 1,928,412 | A | * | 9/1933 | Deninson | 180/21 |
| 2,009,904 | A | * | 7/1935 | Purves | 180/10 |
| 2,535,396 | A | * | 12/1950 | Dube | 446/280 |
| 3,368,822 | A | * | 2/1968 | Treiber | 280/836 |

(Continued)

FOREIGN PATENT DOCUMENTS
JP        3-178801 A       8/1991
(Continued)

*Primary Examiner* — Anne Marie Boehler
*Assistant Examiner* — Maurice Williams
(74) *Attorney, Agent, or Firm* — Carrier Blackman & Associates, P.C.; William D. Blackman; Joseph P. Carrier (57) ABSTRACT The omni-directional drive device comprises a main wheel (2) comprising an endless annular member rotatable around a center of cross section perpendicular to a corresponding tangential line, electric motors (5R and 5L) for producing rotative forces around the rotation axis of the main wheel (2) and around the center of cross section perpendicular to a corresponding tangential line of the main wheel (2) and an arrangement (rotary members (4R and 4L) fitted with free rollers (3R and 3L)) for converting the rotational forces of the electric motors (5R and 5L) to the rotational forces around the rotation center of the main wheel (2) and around the center (C) of cross section perpendicular to a corresponding tangential line of the main wheel (2).

17 Claims, 11 Drawing Sheets

U.S. PATENT DOCUMENTS

| | | | | |
|---|---|---|---|---|
| 3,465,843 A * | 9/1969 | Guinot | | 180/447 |
| 3,746,117 A * | 7/1973 | Alred | | 180/21 |
| 3,762,744 A * | 10/1973 | Sidlauskas | | 280/207 |
| 3,867,787 A * | 2/1975 | Weinger | | 446/274 |
| 4,045,096 A * | 8/1977 | Lidov | | 305/7 |
| 4,223,753 A * | 9/1980 | Bradbury | | 180/6.2 |
| 4,471,567 A * | 9/1984 | Martin | | 446/437 |
| 4,861,053 A * | 8/1989 | Yeomans, Jr. | | 280/205 |
| 4,927,401 A * | 5/1990 | Sonesson | | 446/456 |
| 4,979,582 A * | 12/1990 | Forster | | 180/20 |
| 5,213,176 A | 5/1993 | Oroku et al. | | |
| 5,409,414 A * | 4/1995 | Sheang | | 446/458 |
| D375,986 S * | 11/1996 | Wilkinson et al. | | D21/398 |
| 6,757,936 B2 * | 7/2004 | Yamaguchi et al. | | 16/47 |
| 7,293,790 B2 * | 11/2007 | Byun et al. | | 280/262 |
| 2003/0075366 A1 * | 4/2003 | Sabatie | | 180/7.1 |

FOREIGN PATENT DOCUMENTS

| | | |
|---|---|---|
| JP | 2001-354156 A | 12/2001 |
| JP | 2005-067334 A | 3/2005 |
| JP | 2005-344777 A | 12/2005 |
| WO | WO 98/41295 | 9/1998 |

* cited by examiner

OMNI-DIRECTIONAL DRIVE DEVICE AND OMNI-DIRECTIONAL VEHICLE USING THE SAME

TECHNICAL FIELD

The present invention relates to an omni-directional drive device that can provide a drive force of any desired direction in a two dimensional environment and an omni-directional vehicle using such a drive device.

BACKGROUND OF THE INVENTION

A drive device for an omni-directional vehicle that can freely move about on a floor is known, for instance, from Japanese patent No. 3820239 (patent document 1). This drive device includes a rotatively driven wheel and a plurality of shafts attached to the outer periphery of the driven wheel and each extending in a tangential direction. A barrel shaped roller divided into a plurality of parts is supported by each shaft so as to be ratable around the shaft, and each barrel shaped roller is engaged to the adjacent rollers so as to transmit the rotational movements of the barrel shaped rollers around the corresponding shaft to one another. One of the barrel shaped rollers is rotatively actuated around the corresponding shaft by an electric motor incorporated in the driven wheel.

In this drive device, the rotation of the driven wheel applies a traction in a fore-and-aft direction (or a direction of the rotation of the driven wheel) to the ground contact surface via each barrel shaped roller, and the rotation of the individual barrel shaped rollers applies a traction in a lateral direction (or a direction of the rotation of the barrel-shaped rollers) via the ground contact surfaces of the barrel shaped rollers. Therefore, by suitably selecting the contributions of the fore-and-aft traction and lateral traction, the vehicle can travel in any desired direction.

BRIEF SUMMARY OF THE INVENTION

Task to be Achieved by the Invention

However, according to this prior art, the electric motor for causing the rotational movement of the barrel shaped rollers supported by the shafts mounted on the periphery of the driven wheel must rotate jointly with the driven wheel. Therefore, the arrangement for supplying electric power to the electric motor from a power source located externally of the driven wheel is inevitably highly complex, and difficult to service and maintain.

If the power source is incorporated in the driven wheel, as the electric motor and power transmitting mechanism are already incorporated in the driven wheel, this added complication will make compact design of the device highly difficult. Furthermore, the weight of the driven wheel becomes unacceptably great.

In view of such problems of the prior art, a primary object of the present invention is to provide an omni-directional drive device that does not require a complication of the arrangement for providing a power source for a drive source such as an electric motor, is highly durable and easy to service, avoids an increase in the weight of the rotating (moving) parts, is suited for compact design, and provides a high level of freedom in design, and an omni-directional vehicle using such a drive device.

Means for Achieving the Task

The present invention therefore provides an omni-directional drive device, comprising: a base; a first power transmitting member and a second power transmitting member rotatably supported by the base in a mutually coaxial relationship; a first drive unit and a second drive unit for rotatively actuating the first and second power transmitting members, respectively; a plurality of first free rollers rotatably supported by the first power transmitting member and arranged along a first concentric circle, each first free roller having a rotation axis at angle to a radial direction of the first concentric circle; a plurality of second free rollers rotatably supported by the second power transmitting member and arranged along a second concentric circle, each second free roller having a rotation axis at an angle to a radial direction of the first concentric circle; and a main wheel including a relatively rigid annular member and a flexible endless tube fitted on the annular member, the main wheel being engaged by the first and second free rollers in such a manner that a lateral force of each free roller is transmitted to the main wheel so as to cause a circumferential movement of the main wheel along a circumference thereof and a rotational movement of the endless tube around an annular center line thereof.

According to another aspect of the present invention, there is provided an omni-directional drive device, comprising: a base; a power transmitting member rotatably supported by the base; a drive unit for rotatively actuating the power transmitting member; a plurality of free rollers rotatably supported by the power transmitting member and arranged along a concentric circle, each free roller having a rotation axis at an angle to a radial direction of the concentric circle; and a main wheel including an annular member which is engaged by the free rollers in such a manner that a rotational force of the power transmitting member is transmitted to the main wheel via a lateral force of each free roller.

The present invention also provides an omni-directional vehicle, comprising the omni-directional device according to claim 1, wherein the base includes a payload supporting part.

Effect of the Invention

According to the omni-directional drive device of the present invention, when the two rotary members (drive force transmitting members) disposed laterally one next to the other are rotated in a same direction at a same speed by using the corresponding drive units, the main wheel is rotatively actuated (around the symmetric axis=central axial line B) in the same direction as the two rotary members via the free rollers (drive force transmitting members), and this applies a fore-and-aft traction to the ground contact surface of the main wheel. When the two rotary members are rotatively actuated in different directions and/or at different speeds by using the drive units, because the free rollers engage the main wheel with the central axial line of each free roller slanted with respect to the central axial line B of the main wheel, a component of force that depends on this slanting angle acts upon the outer surface of the main wheel so that the main wheel turns around the center of the circular cross section (around the cross sectional center=central axial line C), and this applies a lateral traction to the ground contact surface of the main wheel. Therefore, by individually controlling the rotational directions and rotational speeds of the two rotary members by using the corresponding drive units, a traction force of any desired direction can be produced as a combination of the vectors of the fore-and-aft and lateral tractions.

Because the drive units for individually actuating the rotary members are all provided on the side of the base, the arrangement for supplying power such as electricity to the drive units is not required to be complex. This in turn allows high durability, ease of maintenance, minimization of the mass of moving parts and enhanced freedom in compact design.

In a preferred embodiment of the present invention, the main wheel is coaxially disposed in relation to the power transmitting members. The endless tube may be made of elastomeric material, and may comprise a plurality of discrete sleeves fitted on the annular member each in a freely rotatable manner. More specifically, the endless tube may comprise a plurality of discrete sleeves fitted on the annular member each in a freely rotatable manner. In such a case, if each sleeve may be in rolling engagement with at least one of the first free rollers and one of the second free rollers at all times, an actuating force is always applied to the main wheel, and the free rolling of all the free rollers can be avoided. It can be accomplished, for instance, if each of the numbers of the first free rollers is greater than the number of the sleeves of the main wheel.

If the omni-directional drive device further comprises a resilient device for urging the first and second power transmitting members toward the main wheel, the rolling contact between the main wheel and each free roller can be ensured. If the first free rollers and second free rollers engage inner circumferential portions of the main wheel from an oblique angle, the main wheel can be rotatably supported by the free rollers, and the need for a bearing of the main wheel can be eliminated.

In the omni-directional vehicle of the present invention, the main wheel may directly engage a road surface or a floor surface, or, alternatively, the vehicle may further comprise a ball engaged by the main wheel, the ball in turn engaging a road surface or a floor surface.

DETAILED DESCRIPTION OF THE PREFERRED EMBODIMENT(S)

An omni-directional drive device embodying the present invention is described in the following with reference to FIGS. 1 to 5.

Figure 1:
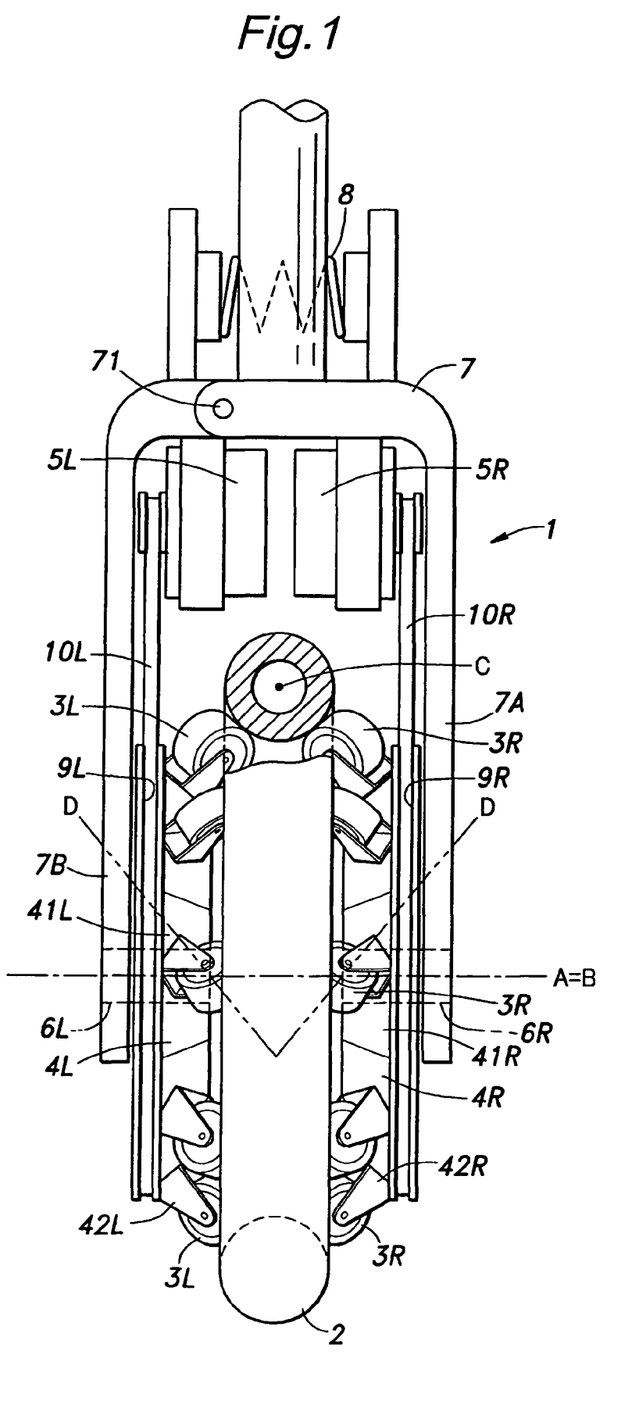
FIG. 1 is a front view of a first embodiment of the omni-directional drive device of the present invention.
Figure 2:
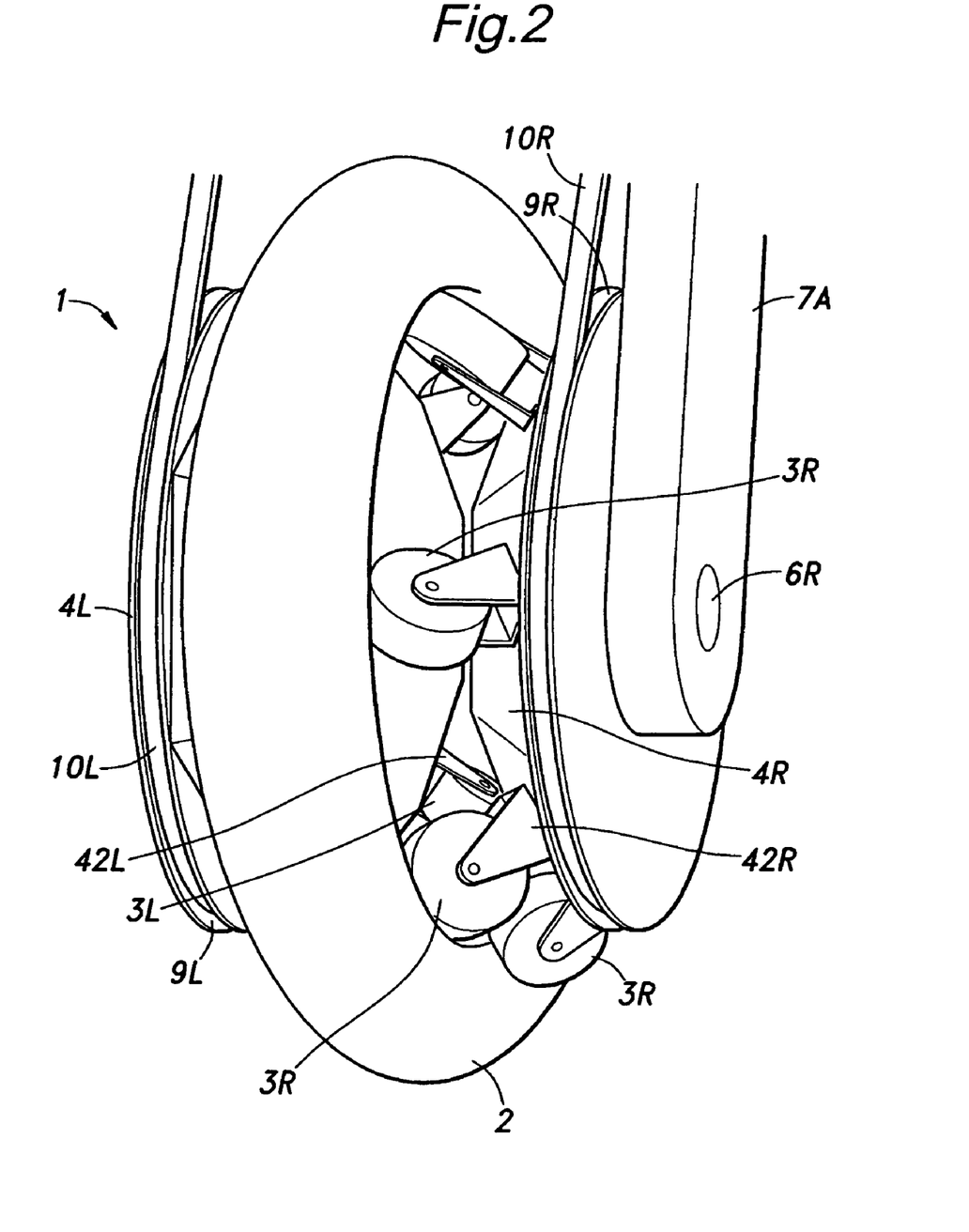
FIG. 2 is a fragmentary perspective view of the first embodiment of the omni-directional drive device of the present invention.

The illustrated omni-directional drive device comprises a base 7, a pair of rotary members (drive force transmitting members) 4R and 4L, a plurality of free rollers 3R and 3L and a main wheel 2. The base 7 is formed as a yoke including a fixed member 7A and a moveable member 7B connected to the fixed member 7A via a hinge pin 71.

The fixed member 7A supports the right rotary member 4R in a rotatable manner via a support shaft 6R. The moveable member 7B supports the left rotary member 4L in a rotatable manner via a support shaft 6L. Thereby, the two rotary members 4R and 4L are configured to be rotatable around a common central axial line A with a certain axial space defined between them.

Each rotary member 4R, 4L is integrally provided with a pulley (or sprocket) 9R, 9L. The base 7 carries a pair of electric motors 5R and 5L. One of the electric motors 5R is drivingly connected to the pulley 9R via a belt (or link chain) 10R to rotatively actuate the pulley 9R. The other electric motor 5L is drivingly connected to the pulley 9L via a belt (or link chain) 10L to rotatively actuate the pulley 9L.

Although not shown in the drawings, the base 7 also supports a rechargeable battery serving as a power source for the electric motors 5R and 5L.

The rotary members 4R and 4L are provided with a tapered outer circumferential surfaces 41R and 41L, respectively, on sides thereof facing each other, each defining a frusto-conical surface. On the tapered outer circumferential surface 41R of one of the rotary member 4R are mounted a plurality (eight, for instance) of free rollers 3R each via a bracket 42R along a circle concentric to the rotational center of the rotary member 4R at a regular interval. On the tapered outer circumferential surface 41L of the other rotary member 4L are mounted a plurality (eight, for instance) of free rollers 3L each via a bracket 42L along a circle concentric to the rotational center of the rotary member 4L at a regular interval.

Figure 3:
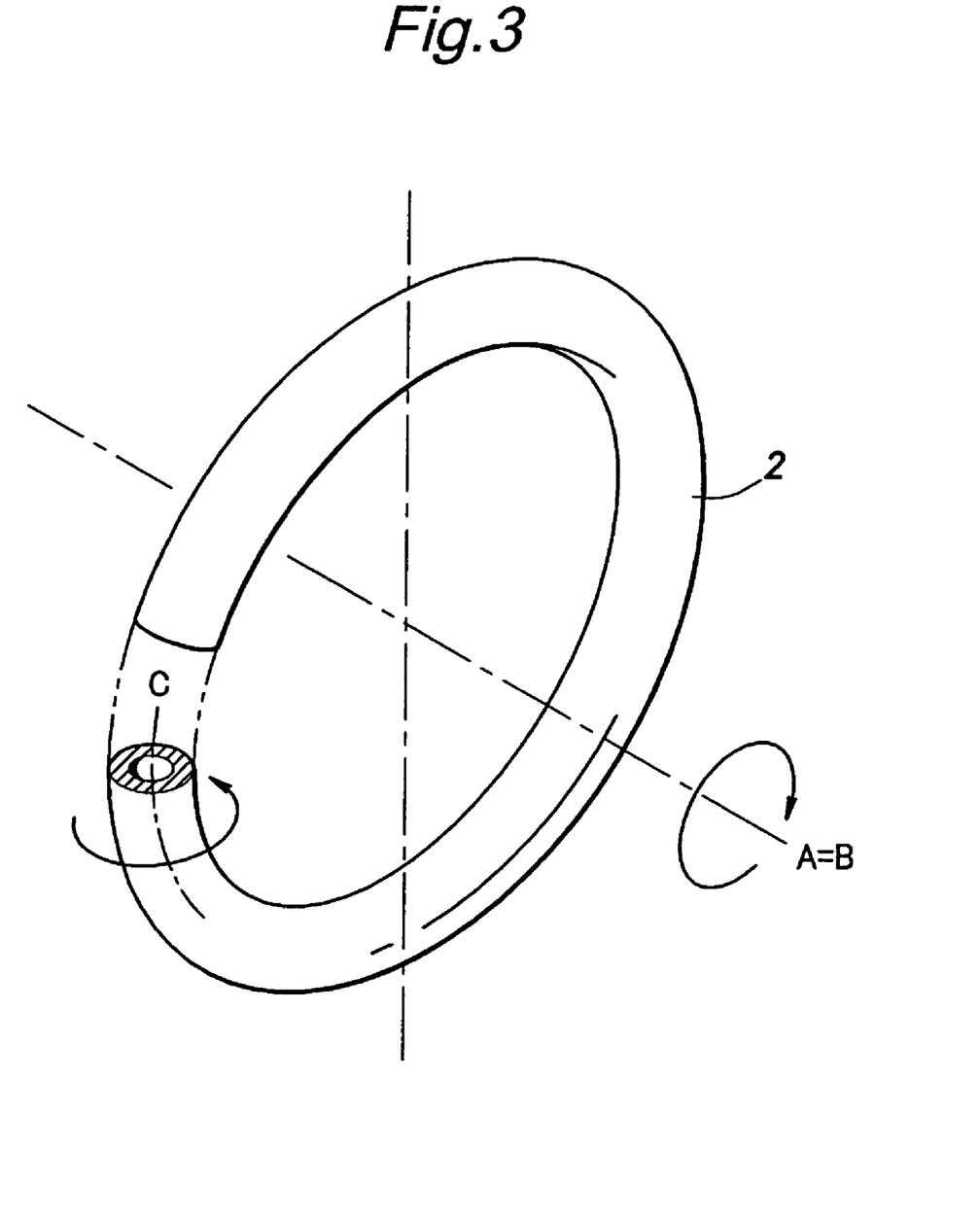
FIG. 3 is a partly broken away perspective view of the main wheel of the first embodiment of the omni-directional drive device of the present invention.

The main wheel 2 comprises an annular member made of rubber or elastomeric resilient material such rubber or elastomeric plastic material having a hollow or solid circular cross section. The main wheel 2 is rotatable around a center of the annular member.

When the outer surface of the main wheel 2 is formed with grid grooves, the main wheel may not have an exactly circular cross section. However, it suffices if the main wheel 2 has a cross sectional shape which enables the main wheel 2 to turn around the center line C thereof. The cross section having surface irregularities such as grid grooves may still be called circular for the purpose of this application.

The main wheel 2 is arranged between the two rotary members 4R and 4L so as to be rotatable around a central axial line (symmetric axis) B coaxial with the central axial line A of the two rotary members 4R and 4L, and is laterally interposed between the free rollers 3R and 3L of the two rotary members 4R and 4L.

A compression coil spring 8 is interposed between the fixed member 7A and moveable member 7B of the base 7. The compression coil spring 8 serves as a biasing means for urging the fixed member 7A and moveable member 7B or the two legs (pivoted parts) of the base 7 toward each other. Thereby, the free rollers 3R and 3L are urged against the outer surfaces of the main wheel 2, and engage the outer surfaces of the main wheel 2 so as to transmit motion (rotational motion) thereto in a torque transmitting relationship. In the illustrated embodiment, as seen in a section perpendicular to the annular axial line of the main wheel 2, the corresponding free rollers 3R and 3L engage the main wheel 2 from a radially inner side thereof. For the main wheel 2 to be retained solely by the free rollers 3R and 3L, the free rollers 3R and 3L are required to engage the inner peripheral part of the main wheel 2, instead of engaging the lateral sides of the main wheel 2. Furthermore, to avoid interferences between the free wheels 3R and 3L, the free rollers 3R and 3L are required to engage the inner peripheral part of the main wheel 2 from oblique directions. However, the present invention is not limited by the illustrated embodiment. For instance, as seen in a cross section perpendicular to the annular axial line of the main wheel 2, the free rollers 3R and 3L may also engage the outer peripheral part of the main wheel 2 from oblique directions.

What is important here is that the free rollers 3R and 3L are rotatable around axial lines D that do not cross and are not parallel to the central axial line B (which is the same as the central axial line A of the rotary members 4R and 4L) (or in a relationship of skew lines). More specifically, the directions of the rotational axes of the free rollers 3R and 3L should be determined so as to enable the free rollers 3R and 3L to apply lateral forces to the main wheel as the rotary members 4R and 4L turn.

Figure 4:
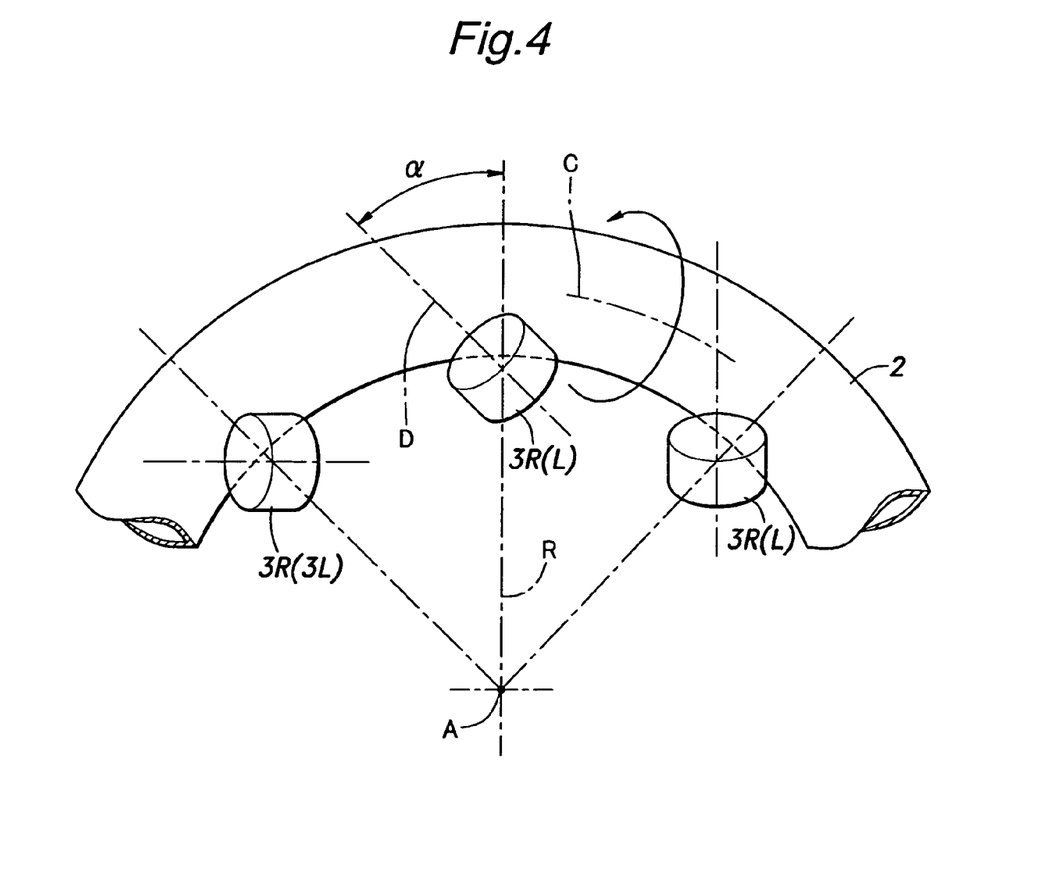
FIG. 4 is a diagram illustrating the relationship between the main wheel and free rollers as seen in the axial direction of the symmetric axis.
Figure 5:
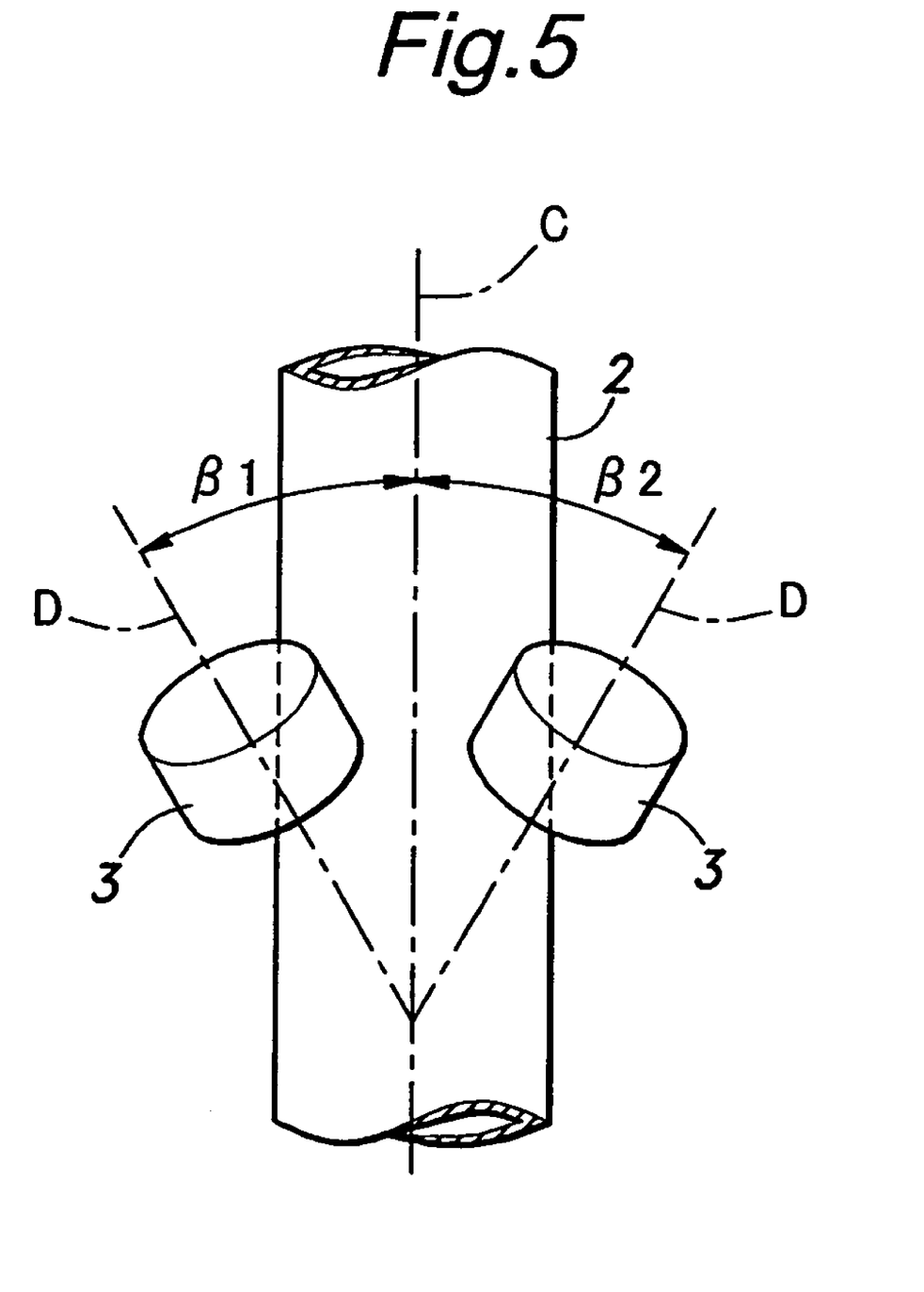
FIG. 5 is a diagram illustrating the relationship between the main wheel and free rollers as seen from the center of the main wheel in a radial direction.

This is described in the following in greater detail with reference to FIGS. 4 and 5. The central axial line D of each free roller is slanted with respect to the corresponding radial direction R of the main wheel 2 by a certain angle ($\alpha$ in FIG. 4) as seen from the direction of the symmetric axis line of the main wheel 2, and is also slanted with respect to the corresponding cross sectional center line of the main wheel 2 by a certain angle ($\beta_1$ and $\beta_2$ in FIG. 5) as seen from the inner periphery of the main wheel 2 in the direction of the corresponding radial line. This three dimensional slanting of the axial line is similar to the slanting of the teeth of a skew bevel gear on a conical plane of a certain cone angle. The central axial line of a cross section of the main wheel 2 as used herein means a central line defined by the center of the circular cross section of the main wheel. The central axial line of a cross section of the main wheel 2 will be simply referred to as a cross sectional center line (C) hereinafter.

The slanting angle α is required to be non-zero, and each of the slanting angles β1 and β2 is require to be any angle other than 90 degrees.

By slanting the central axial line of each free roller 3R, 3L with respect to an imaginary plane perpendicular to the horizontal central axial line A=B in a three dimensional space, the frictional force acting at the contact point between the peripheral surface of each free roller 3R, 3L and the corresponding outer surface of the main wheel 2 provides, as a lateral force of the free roller, a component extending in the tangential direction of the main wheel 2 (around the central axial line A=B) and a component extending around the cross sectional center line (C). It should be noted that it suffices if the central axial line of each free roller of one of the two sets of the free rollers is three dimensionally slanted while the central axial line of each free roller of the other set of the free rollers is in parallel with the rotational direction of the main wheel 2.

To maximize such a frictional force, the contact surfaces of the free rollers 3R and 3L and main wheel 2 may be formed as irregular surfaces or roughened.

The mode of operation of the illustrated omni-directional drive device is described in the following.

When the two rotary members 4R and 4L are turned in a same direction at a same speed by using the electric motors 5R and 5L, the rotational movements of the rotary members 4R and 4L are transmitted to the main wheel 2 by friction via the free rollers 3R and 3L mounted on the rotary members 4R and 4L. Because the central axial line D of each free roller 3R, 3L is slanted as discussed above, and are symmetrically arranged with respect to the main wheel 2. When the two rotary members 4R and 4L are turned in a same direction at a same speed, the frictional force at the contact surface between each free roller 3R, 3L and the main wheel 2 is essentially directed in the circumferential (tangential) direction of the main wheel 2 or around the central axial line B. Thereby, a drive force centered around the central axial line B of the main wheel 2 acts upon the contact surface of the main wheel 2.

Figure 6:
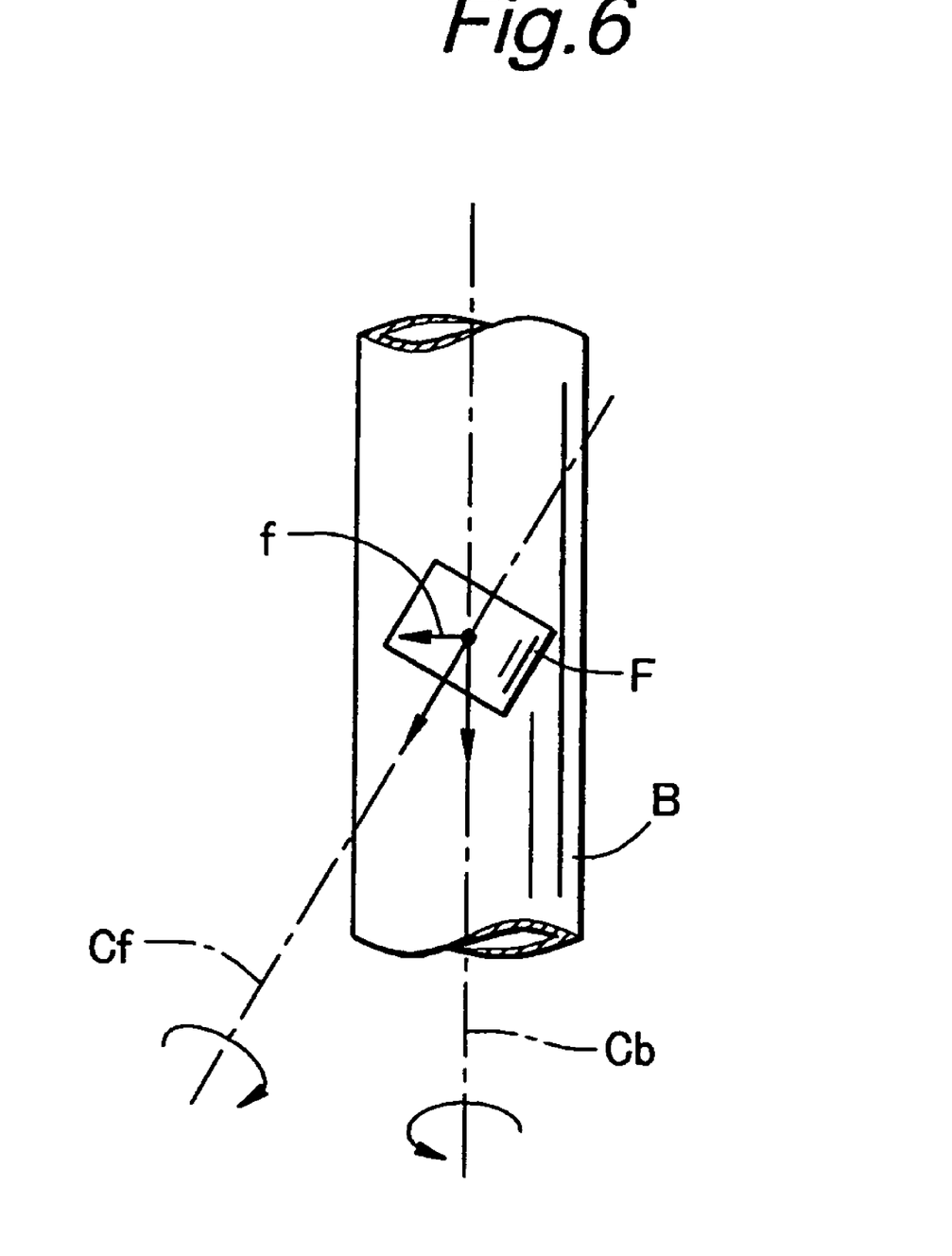
FIG. 6 is a diagram illustrating the working principle of the device of the present invention.

As illustrated in the diagram of FIG. 6, as the outer circumferential surface of a rod B having a circular cross section and rotatable around a central axial line Cb thereof is engaged by a free roller F whose central axial line Cf is slanted with respect to the rod B, and the free roller F is moved along the central axial line Cb of the rod B, owing to the component f of the frictional force acting between the free roller F and rod B at the point of contact between them, the rod B is subjected to a rotational drive force that turns the rod B around the central axial line Cb thereof.

This working principle is described in more detail with reference to the illustrated omni-directional drive device 1. When the two rotary members 4R and 4L are turned in different directions and/or at different speeds by using the electric motors 5R and 5L, in addition to the circumferential (tangential) force owing to the rotations of the two rotary members 4R and 4L, a component of force perpendicular to this circumferential force acts upon the contact surface of each free roller 3R, 3L with the main wheel 2. This component of force applies a rotational drive force that twists the outer surface of the main wheel 2 around the cross sectional center line (C) of the main wheel, and this in turn causes the main wheel to turn around the cross sectional center line (C).

The rotation of the main wheel 2 around the cross sectional center line (C) thereof depends on the rotational speed difference between the two rotary members 4R and 4L. For instance, when the rotary members 4R and 4L are turned in mutually opposite directions at a same speed, the main wheel 2 does not rotate around the central axial line B (symmetrical axial line) thereof, but rotates around the cross sectional center line (C). Thereby, the main wheel 2 receives a lateral drive force or a drive force of the same direction as the central axial line B of the main wheel B.

By thus individually controlling the rotational speeds and directions of the rotary members 4R and 4L by using the electric motors 5R and 5L, the main wheel 2 is enabled to move in any desired direction on a plane.

Figure 7:
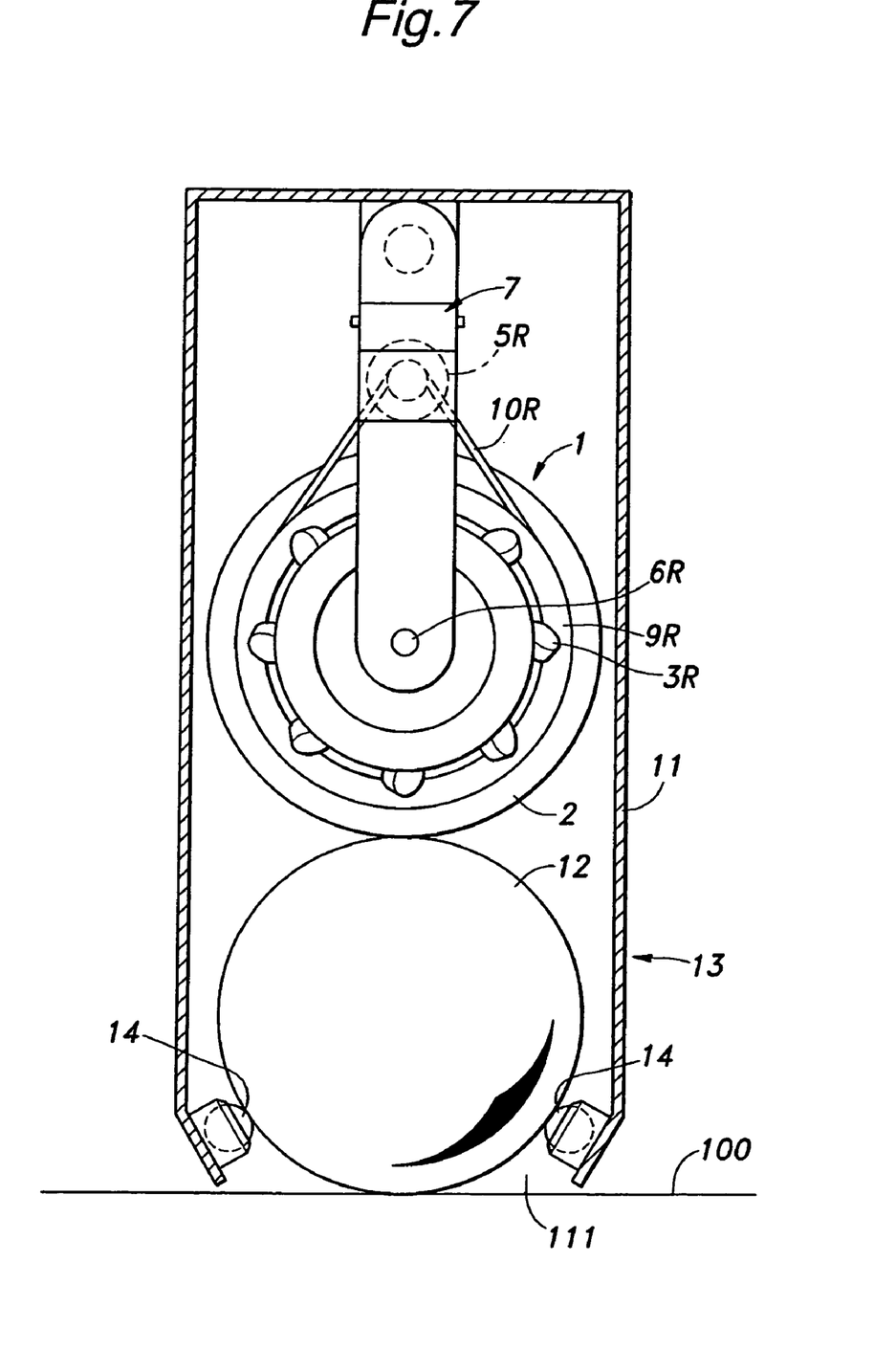
FIG. 7 is a simplified front view of an embodiment of the omni-directional vehicle of the present invention using the all the axial direction illustrated in FIGS. 1 and 2.

FIG. 7 shows an embodiment of the omni-directional vehicle of the present invention. The omni-directional vehicle of the illustrated embodiment comprises a box-shaped vehicle body 11 having an open bottom end and a traveling ball 12 received in the vehicle body 11 so as to be able to roll in any direction. A lower part of the traveling ball 12 is exposed from the open lower end 111 of the box shaped vehicle body 11, and rolls over a floor surface 100. The traveling ball 12 is prevented from being dislodged downward from the vehicle body 11 by supporting balls 14 mounted on the parts of the vehicle body 11 adjacent to the open lower end 111 thereof.

An omni-directional drive device 1 is disposed on top of the traveling ball 12 inside the vehicle body 11. The omni-directional drive device 1 has a base 7 which fixedly depends from a part of the vehicle body 11 so that the main wheel 2 of the omni-directional drive device 1 engages the spherical surface of the traveling ball 12 in a frictionally torque transmitting relationship.

Thereby, the traveling ball 12 can be actuated into a rolling movement of a desired direction by the omni-directional drive device 1 so that the vehicle body 11 can travel in any desired direction.

The contact pressure of the main wheel 2 onto the traveling ball 12 is obtained by the weights of the vehicle body 11 and omni-directional drive device 1, and the load on the vehicle body 11 that may be supported by the vehicle body 11.

Figure 8:
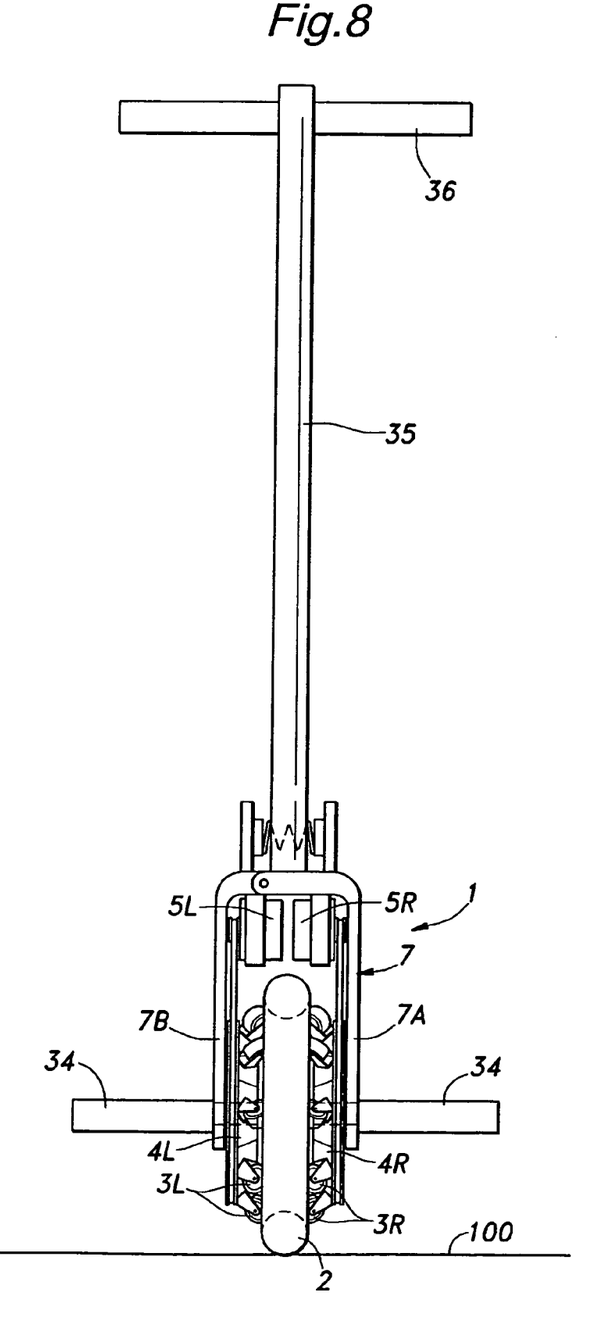
FIG. 8 is a simplified front view of another embodiment of the omni-directional vehicle of the present invention using the all the axial direction illustrated in FIGS. 1 and 2.

FIG. 8 shows another embodiment of the omni-directional vehicle using the omni-directional drive device 1 of the present invention.

The illustrated omni-directional vehicle is provided with a pair of steps 34 extending laterally from either side of the base 26 of the omni-directional drive device 1 (from the fixed member 7A and moveable member 7B, respectively). To the base 7 (fixed member 7A) is connected a lower end of a pole 35. The upper end of the pole 35 supports a handle bar 36.

This omni-directional vehicle is similar to a monocycle in appearance. A rider places his feet on the steps 34 and holds the handle bar 36 by his hands while the main wheel 2 directly engages the floor surface.

In this embodiment also, by suitably controlling the rotations of the two rotary members 4R and 4L, the main wheel 2 can produce a drive force of a desired direction in the contact surface of the object to be actuated.

Figure 9:
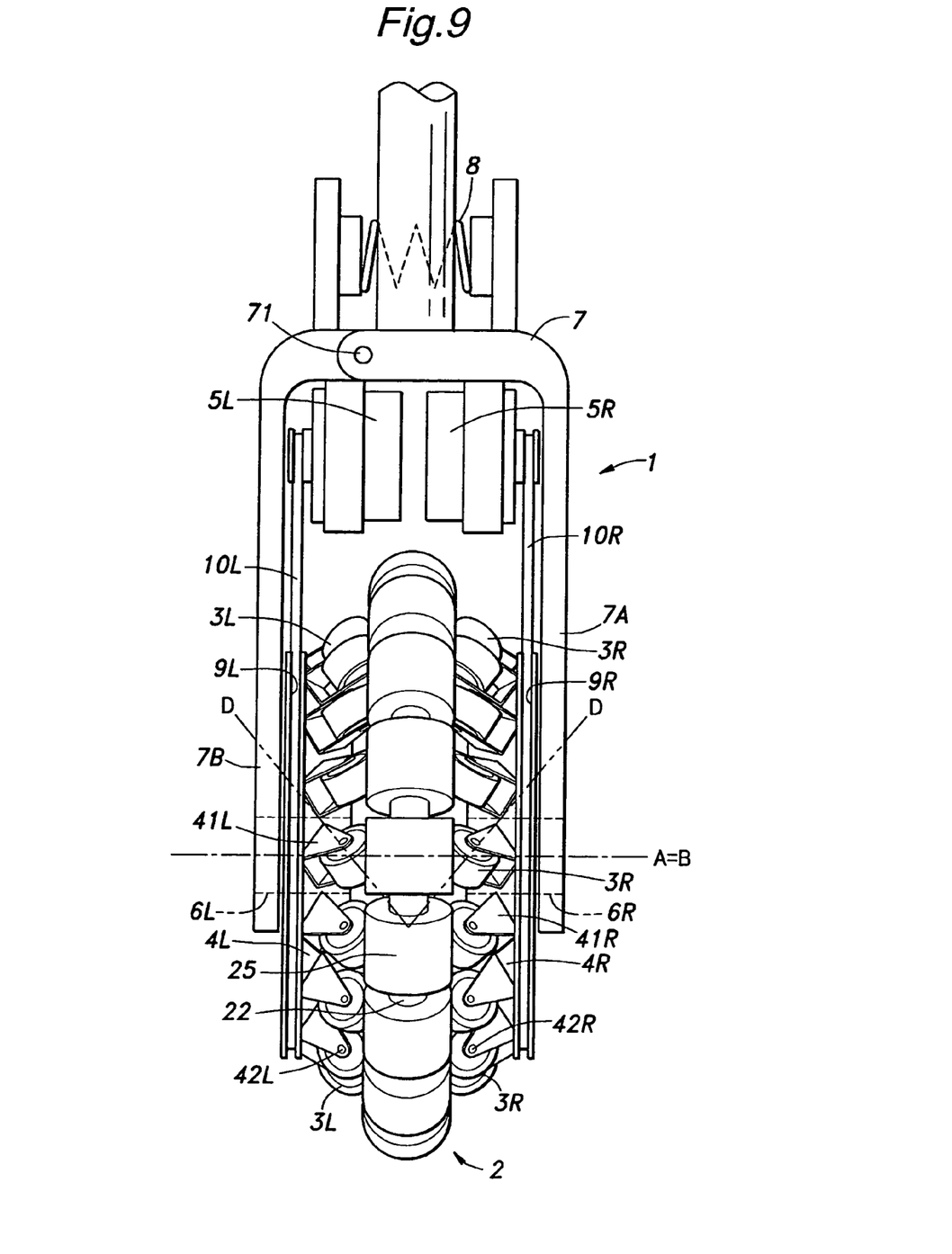
FIG. 9 is a simplified front view of yet another embodiment of the omni-directional vehicle of the present invention using the all the axial direction illustrated in FIGS. 1 and 2.
Figure 10:
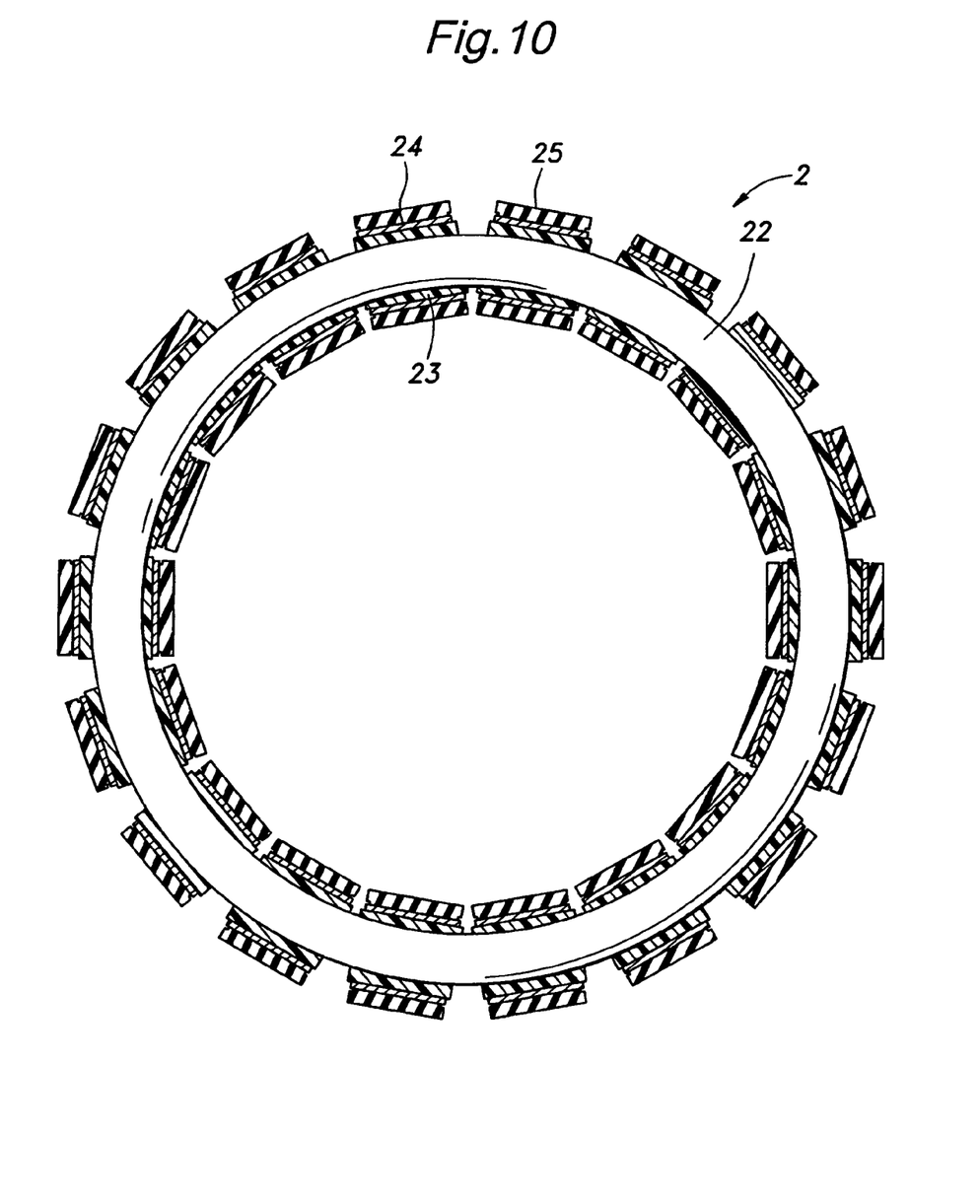
FIG. 10 is a simplified sectional view of the main wheel of the omni-directional drive device illustrated in FIG. 9.

The embodiment illustrated FIGS. 9 and 10 is similar to the embodiment illustrated in FIG. 8, but differs therefrom in the structure of the main wheel 2. The main wheel 2 of this embodiment comprises an annular shaft 22 and a plurality of sleeves 25 each rotatably supported by the annular shaft 22 so as to be rotatable around the tangential axial line of the corresponding point of the annular shaft 22 and engage an object to be actuated.

More specifically, a plurality of inner sleeves 23 are fitted on the annular shaft 22 so as to be immobile both along the circumference of the annular shaft 22 and around the axial center of the annular shaft 22. Each inner sleeve 23 rotatably supports an outer sleeve 25 having a bearing metal 24 integrally formed on the inner circumferential surface thereof. Each outer sleeve 25 serves as a free roller that engages an object to be actuated, and are fitted on an annular shaft 22 like beads of a rosary through which a string is passed. Each outer sleeve 25 is freely rotatable around a tangential line of the corresponding part of the annular shaft 22 or an axial line corresponding to the cross sectional center line (C) which coincides with the central axial line of the outer sleeve 25.

The cross sectional center line of the main wheel 2 of the illustrated embodiment is formed by connecting the rotation axis of the sleeves into a ring, and a rotation around the cross sectional center line (C) of the main wheel is obtained by the rotation (around itself) of each outer sleeve 25 itself.

As the main wheel 2 of the illustrated embodiment rotates around the annular shaft 22 or around the cross sectional center line (C) thereof, caused by the contact with the free rollers 3R and 3L that rotate with the rotary members 4R and 4L, a lateral drive force is applied to the ground surface. At the same time, owing to the movement of the outer sleeves 25 caused by the overall rotation of the main wheel 1, a fore-and-aft drive force is applied to the ground surface.

In this case also, to ensure that a drive force acts upon (at least one of) the main wheel 2 at all times and avoid the situation where the first free rollers 14 are all free rolling, it is preferable to ensure that each outer sleeve 25 is engaged by at least one of the first free rollers 14 or at least one of the second free rollers 15 at all times. In the illustrated embodiment where the lengths of the first and second moveable members are substantially equal to each other, the densities of the first and second free rollers 14 and 15 with respect to the outer sleeves 25 are appropriately determined, and the first and second free rollers 14 and 15 are more numerous than the outer sleeves 25. Alternatively, the density of the first free rollers 14 along the length of the first moveable member or the density of the second free rollers 15 along the length of the second moveable member may be greater than the density of the outer sleeves 25 along the second moveable member.

Figure 11:
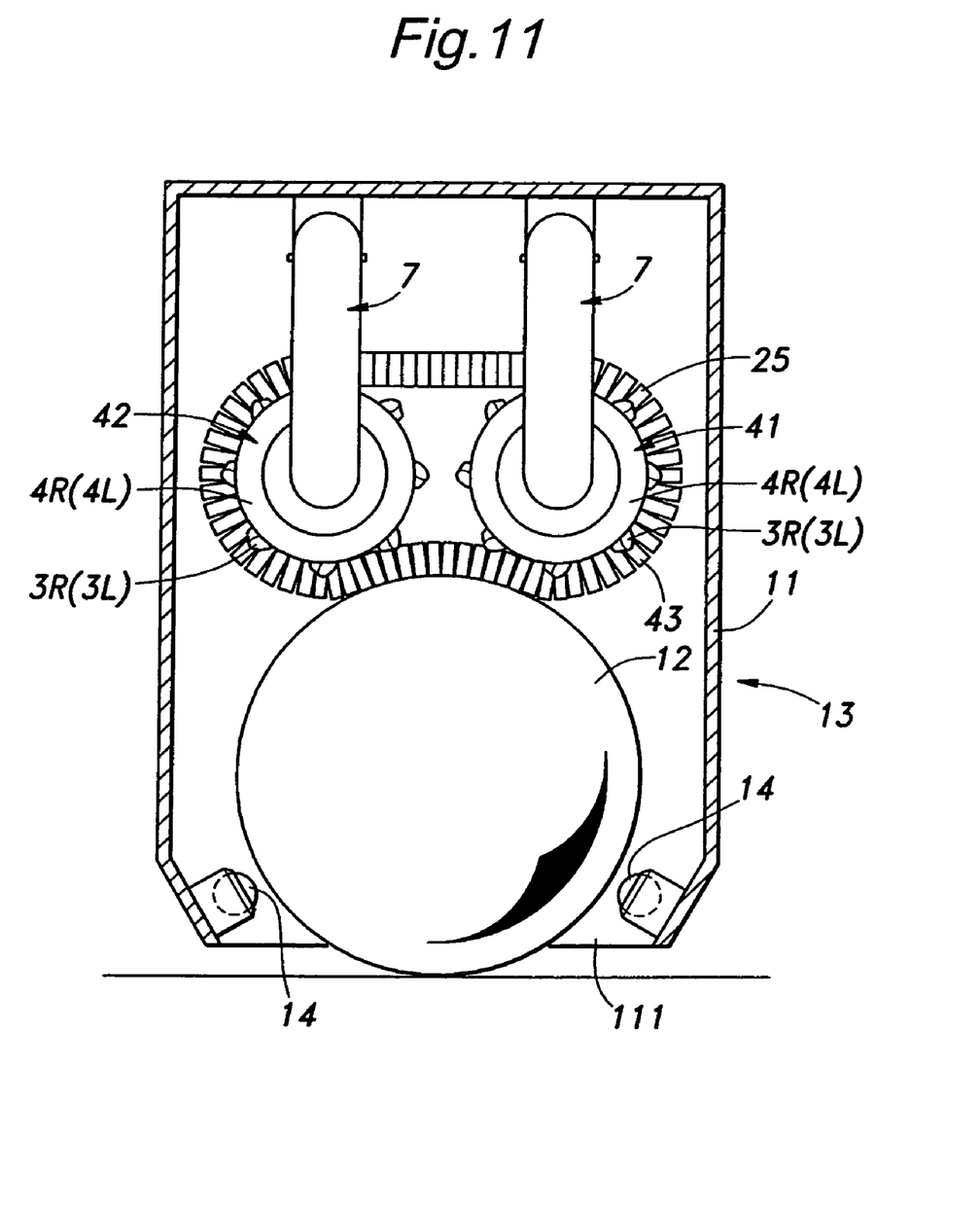
FIG. 11 is a simplified side view of another embodiment of the omni-directional drive device according to the present invention, and an omni-directional vehicle using this omni-directional drive device.

FIG. 11 show yet another embodiment of the omni-directional drive device and omni-directional vehicle of the present invention. In FIG. 11, the parts corresponding to those of FIG. 7 are denoted with like numerals without repeating the description of such parts.

In the illustrated direction drive device and omni-directional vehicle, a pair of rotary wheel assemblies 41 and 42 are rotatably supported by a base (vehicle body) 11 in a mutually spaced apart relationship, and an endless belt 43 corresponding to the main wheel 2 of the previous embodiment is passed around these rotary wheel assemblies 41 and 42.

Each rotary wheel assembly 41, 42 comprises a pair of rotary members 4R and 4L supported by a base 7 in a laterally spaced part relationship so as to be rotatable around a common central axial line, a pair of electric motors (not shown in the drawing) mounted on the base 7 and configured to rotatively drive the two rotary members individually, and free rollers 3R and 3L mounted on the outer periphery of the corresponding rotary members 4R and 4L. In other words, each rotary wheel assembly 41, 42 is incorporated with rotary members similar to those illustrated in FIGS. 1 and 2.

The endless belt 43 is disposed between the two rotary members 4R and 4L (of each rotary wheel assembly 41, 42), and is interposed between the free rollers 3R and 3L of the two rotary members 4R and 4L while being passed around the two rotary wheel assemblies 41 and 42.

The endless belt 43 is formed, so to speak, by replacing the annular shaft 22 of the main wheel 2 shown in FIG. 9 with a flexible endless core, and fitting thereon a plurality of sleeves 25 like beads of a rosary so as to be rotatable around an axial line thereof. The endless belt 43 engages the traveling ball 12 at a section thereof between the two rotary wheel assemblies 41 and 42.

Each free roller 3R, 3L is rotatable around a central axial line which is not perpendicular to or parallel to a part of the central axial line of the endless belt 43 wrapped around each of the rotary wheel assemblies 41 and 42 or a same axial line as the central axial line of each of the rotary members, and engages the outer surface of the endless belt 43 or the outer circumferential surface of each outer sleeve 25.

In the illustrated embodiment, the rotation of each outer sleeve 25 around the axial center line thereof causes a lateral drive force to the applied to the traveling ball 12, and the movement of the endless belt 43 between the two rotary wheel assemblies 41 and 42 causes a fore-and-aft drive force to the applied to the traveling ball 12.

Although the present invention has been described in terms of preferred embodiments thereof, it is obvious to a person skilled in the art that various alterations and modifications are possible without departing from the scope of the present invention which is set forth in the appended claims. The contents of the original Japanese patent application on which the Paris Convention priority claim is made for the present application are incorporated in this application by reference.

REFERENCE NUMERALS 1 omni-directional vehicle
2 main wheel 3R, 3L free rollers
4L, 4R rotary members
5L, 5R electric motors
7 base
8 compression coil spring
12 traveling ball
13 omni-directional vehicle
22 annular shaft
25 outer sleeve

The invention claimed is:

1. An omni-directional drive device, comprising:
a base;
a first power transmitting member and a second power transmitting member rotatably supported by the base in a mutually coaxial relationship;
a first drive unit and a second drive unit for rotatively actuating the first and second power transmitting members, respectively;
a plurality of first free rollers rotatably supported by the first power transmitting member and arranged along a first concentric circle, each first free roller having a rotation axis which is related to a rotation axis of the first power transmitting member as skew lines;
a plurality of second free rollers rotatably supported by the second power transmitting member and arranged along a second concentric circle, each second free roller having a rotation axis which is related to a rotation axis of the second power transmitting member as skew lines; and
a main wheel for exerting an omni-directional drive force to propel the device including an annular tubular member configured to rotate around a cross sectional center line thereof, and engaged by the first and second free rollers in such a manner that a lateral force of each free roller is transmitted to the main wheel so as to cause a circumferential movement of the main wheel along a circumference thereof and a rotational movement of the annular member around the cross sectional center line thereof.

2. The omni-directional drive device according to claim 1, wherein the main wheel is coaxially disposed in relation to the power transmitting members.

3. The omni-directional drive device according to claim 2, wherein the annular tubular member is made of elastomeric material.

4. The omni-directional drive device according to claim 1, wherein the main wheel comprises an annular shaft member and a plurality of discrete sleeves fitted on the annular shaft member each in a freely rotatable manner.

5. The omni-directional drive device according to claim 4, wherein each sleeve is in rolling engagement with at least one of the first free rollers and one of the second free rollers at all times.

6. The omni-directional drive device according to claim 4, wherein the numbers of the first and second free rollers are each greater than that of the number of the sleeves of the main wheel.

7. The omni-directional drive device according to claim 1, wherein the first and second free rollers engage an inner circumferential part of the main wheel from oblique directions.

8. The omni-directional drive device according to claim 1, further comprising a resilient device for urging the first and second power transmitting members toward the main wheel.

9. The omni-directional drive device according to claim 1, wherein the main wheel engages a road surface or a floor surface.

10. The omni-directional drive device according to claim 1, further comprising a ball engaged by the main wheel, the ball in turn engaging a road surface or a floor surface.

11. The omni-directional drive device according to claim 1, wherein the base includes a payload supporting part.

12. The omni-directional drive device according to claim 1, further comprising:
a third power transmitting member and a fourth power transmitting member rotatably supported by the base in a mutually coaxial relationship;
a third drive unit and a fourth drive unit for rotatively actuating the third and fourth power transmitting members, respectively;
a plurality of third free rollers rotatably supported by the third power transmitting member and arranged along a third concentric circle, each third free roller having a rotation axis which is related to a rotation axis of the third power transmitting member as skew lines; and
a plurality of fourth free rollers rotatably supported by the fourth power transmitting member and arranged along a fourth concentric circle, each fourth free roller having a rotation axis which is related to a rotation axis of the fourth power transmitting member as skew lines; and
the main wheel being additionally engaged by the third and fourth free rollers in such a manner that a lateral force of each free roller is transmitted to the main wheel so as to cause a circumferential movement of the main wheel along a circumference thereof and a rotational movement of the annular tubular member around the cross sectional center line thereof.

13. An omni-directional vehicle, comprising the omni-directional device according to claim 1, wherein the base includes a payload supporting part.

14. The omni-directional vehicle according to claim 13, wherein the main wheel engages a road surface or a floor surface as the driving object.

15. The omni-directional vehicle according to claim 13, wherein the main wheel engages a road surface or a floor surface via a ball that serves as the driving object.

16. An omni-directional drive device, comprising:
a base;
a power transmitting member rotatably supported by the base;
a drive unit for rotatively actuating the power transmitting member;
a plurality of free rollers rotatably supported by the power transmitting member and arranged along a concentric circle, each free roller having a rotation axis which is related to a rotation axis of the power transmitting member as skew lines; and
a main wheel for exerting an omni-directional drive force to propel the device including an annular tubular member which is engaged by the free rollers in such a manner that a rotational force of the power transmitting member is transmitted to the main wheel via a lateral force of each free roller.

17. The omni-directional drive device according to claim 16, wherein the main wheel is coaxially disposed in relation to the power transmitting member.

* * * * *